United States Patent [19]

Lowry Jr. et al.

[11] Patent Number: 4,882,903
[45] Date of Patent: Nov. 28, 1989

[54] COMBINED CYCLE WASTE-TO-ENERGY PLANT

[75] Inventors: William L. Lowry Jr., Yukon, Okla.; Maurice G. Woods, 4301 St. George Dr., Oklahoma City, Okla. 73120; Charles A. Martin, Oklahoma City, Okla.

[73] Assignees: CH Guernsey & Company, Oklahoma City; Maurice G. Woods, Oklahoma City; Teresa J. Woods, Oklahoma City; Applied Thermal Systems, Inc., Oklahoma City, all of Okla.

[21] Appl. No.: 176,782

[22] Filed: Apr. 1, 1988

[51] Int. Cl.⁴ .................................. F02C 6/18
[52] U.S. Cl. .................... 60/39.182; 60/39.464; 110/220; 110/222; 110/228; 110/212; 110/255
[58] Field of Search ............ 60/39.12, 39.182, 39.464, 60/732; 110/222, 220, 228, 289, 117, 210, 212, 255, 214

[56] References Cited

U.S. PATENT DOCUMENTS

| | | | |
|---|---|---|---|
| 111,615 | 2/1871 | Crampton | 110/118 |
| 3,086,362 | 4/1963 | Foster-Pegg | 60/39.182 |
| 3,792,671 | 2/1974 | Woods | 110/8 |
| 4,058,974 | 11/1977 | Pfenninger | 60/39.182 |
| 4,193,259 | 3/1980 | Muenger et al. | 60/39.182 |
| 4,254,716 | 3/1981 | Graham | 110/222 |
| 4,257,223 | 3/1981 | Enga | 60/39.182 |
| 4,270,470 | 6/1981 | Barnett et al. | 110/222 |
| 4,271,665 | 6/1981 | Mandrin | 60/39.182 |
| 4,308,809 | 1/1982 | Woods | 110/346 |
| 4,468,923 | 9/1984 | Jorzyk et al. | 60/39.182 |
| 4,706,612 | 11/1987 | Moreno et al. | 60/39.182 |
| 4,740,127 | 4/1988 | Galgana et al. | 110/255 |

Primary Examiner—Donald E. Stout
Attorney, Agent, or Firm—Hubbard, Thurman, Turner & Tucker

[57] ABSTRACT

A combined cycle waste-to-energy plant is utilized to thermally convert municipal and industrial solid wastes into essentially complete products of combustion and use the combustion heat to produce steam and/or electrical power. The plant includes a building enclosure having a waste receiving area, a waste fuel separation and processing area, an incinerator area and a heat recovery and power generation area. Processed waste fuel is delivered to a series of incinerators by an automated conveyor and hopper system, and the waste fuel is burned in the incinerators by hot exhaust gas delivered thereto from one or more combustion turbines located outside the building and drivingly connected to electrical generators. Inlet air to the turbines is drawn from with the building to maintain its interior at a negative pressure, thereby preventing waste odors and pathogens from escaping from the building. Hot combustion turbine exhaust gas delivered to the incinerators is passed through a superheater, and a portion of the exhaust gas exiting the superheater is passed through a waste heat recovery boiler. Hot combustion gas discharged from each of the incinerators is passed through an associated combusion heat recovery boiler. Gas heat recovered in the superheater and the various boilers is utilized to produce steam which operates a steam turbine drivingly connected to an electrical generator. A portion of the steam generated may also be used for process purposes.

21 Claims, 3 Drawing Sheets

COMBINED CYCLE WASTE-TO-ENERGY PLANT

BACKGROUND OF THE INVENTION

The present invention relates generally to combustible waste incineration systems and, in a preferred embodiment thereof, more particularly provides an improved system for incinerating municipal, commercial and/or industrial solid waste, or any other non-hazardous combustible waste, and responsively generating process steam and/or electricity.

In the past, various systems have been proposed for incinerating waste and utilizing the resulting combustion gases discharged from the incineration apparatus to form steam which is used to drive a steam turbine electrical generator and/or produce a source of process steam. Conventional waste-to-energy systems of this type have been characterized by a relatively low energy conversion efficiency compared, for example, to natural gas fired electrical generating plants. This rather low efficiency is attributable to the fact that a significant portion of the thermal energy released in the combustion of the waste is expended in heating the combustion air delivered to the incineration equipment and in drying and heating moisture contained in the waste.

Frequently the waste delivered to the incineration equipment is so wet that the incineration process requires that another fuel (e.g., natural gas) be burned, providing additional heat to sustain combustion of the waste and to maintain a temperature high enough to ensure complete combustion of the waste. Also, the products of combustion of some wastes are corrosive to alloy steels which are generally used to achieve high steam superheat temperatures.

It is accordingly an object of the present invention to provide an improved waste incineration and energy generating system in which above-mentioned and other limitations and disadvantages associated with conventional waste-to-energy systems are significantly reduced, and a variety of other operational improvements are provided.

SUMMARY OF THE INVENTION

In carrying out principles of the present invention, in accordance with a preferred embodiment thereof, a combined cycle waste-to-energy plant is provided for thermally converting municipal solid waste (MSW) into essentially complete products of combustion while utilizing the MSW as a supplemental fuel in the simultaneous production of steam and electrical energy.

The plant includes a building enclosure having an MSW receiving and storage area provided with a tipping area, a waste fuel separation and processing area, a waste incineration area positioned beneath an incineration heat recovery area, and a waste heat recovery and electrical power generating area.

A series of MSW incinerators are positioned in the waste incineration area, each of the incinerators being positioned beneath an associated one of a series of incinerator heat recovery boilers disposed in the incinerator heat recovery area. A waste fuel receiving hopper is operatively connected to the inlet ram feed section of each incinerator.

Processing means, including a plurality of processing stations, are provided in the processing area of the building for converting MSW dumped on the tipping floor by refuse delivery trucks to shredded refuse derived fuel (RDF) from which large noncombustible items and ferrous metal, etc. have been removed for separate disposal. The processing means include a plurality of elevated, flop-gated discharge chutes, one associated with each processing station, for discharging RDF onto a selected one of a duality of RDF conveyors which extend from the processing area to the waste incinerator RDF receiving hoppers. Plow blade means are disposed adjacent each receiving hopper and are operative to divert RDF from either or both of the conveyors into a selected one of the receiving hoppers to load an associated incinerator in a predetermined sequence.

RDF loaded into the incinerators is efficiently converted into essentially complete products of combustion utilizing hot exhaust gases discharged from a plurality of combustion turbines positioned exteriorly of the building through a discharge duct system operatively connected to the combustion chambers of the incinerators. Inlet air to the compressor sections of the combustion turbines is drawn from the interior of the building, thereby maintaining its interior at a negative pressure to prevent escape of MSW odors and pathogens from the building. A suitable air makeup system is provided for replenishing the air withdrawn from the building in this manner.

Each of the combustion turbines is drivingly connected to an electrical generator to thereby produce electrical energy during operation of the plant. To selectively augment the flow of heated gas through the combustion turbine exhaust duct, a gasfired duct burner and associated fan are connected thereto, the fan drawing its inlet air from within the building.

Positioned within the waste heat recovery and electrical power generating area of the building are a steam superheater, a waste heat recovery boiler, a steam turbine drivingly connected to an electrical generator, a condenser, and a condensate deaeration system. The plant also includes a suitable condensate/feedwater system which flows feed water to the incinerator heat recovery boilers and the waste heat recovery boiler. Hot combine exhaust gases are flowed through the gas side of the steam superheater to thereby reduce the temperature of the exhaust gases from approximately 1000° F. to approximately 600° F. A first portion of the 600° F. exhaust gas is flowed into the incinerators, providing combustion air to burn the RDF therein, while the balance of the 600° F. exhaust gas is flowed through the waste heat recovery boiler. The gaseous products of combustion from the incinerators, at approximately 1800° F., are flowed through the incinerator heat recovery boilers and discharged from their stacks at approximately 350° F. Appropriate flue gas treatment equipment is provided as required.

The hot combustion turbine exhaust gases passing through the waste heat recovery boiler, and the RDF combustion gases passing through the incinerator heat recovery boilers, converts the feedwater flowing therethrough to saturated steam which is flowed through the steam side of the superheater. Hot combustion turbine exhaust gases flowing through the superheater convert the saturated steam into superheated steam which is flowed through the steam turbine to drive its associated electrical generator. Steam exiting the steam turbine is converted again to a saturated liquid condition by the condenser portion of the condensate/feedwater system and this liquid is then flowed through the deaerator. Suitable taps may be made into various steam flow portions of the system to provide a convenient source of saturated or superheated process steam.

As can be seen from the foregoing, the combined cycle waste-to-energy plant of the present invention very efficiently functions to thermally convert MSW into essentially complete products of combustion, and additionally utilizes the MSW as a supplemental fuel to simultaneously produce steam and to generate electrical power from two separate sources—the combustion turbines and the steam turbine generator. Due to the negative pressure automatically maintained within its building enclosure, the escape of stored MSW odors and pathogens is effectively precluded, thereby permitting the plant to be operated in previously unsuitable urban and residential areas.

While the combined cycle waste-to-energy system of the present invention is particularly well suited for MSW incineration applications, it will be readily apparent to one skilled in this art that the system could also be advantageously utilized in the incineration of other non-hazardous combustible solid or liquid waste such as commercial and/or industrial solid waste, dewatered sewage sludge, waste animal fat and the like.

DETAILED DESCRIPTION

Figure 1:
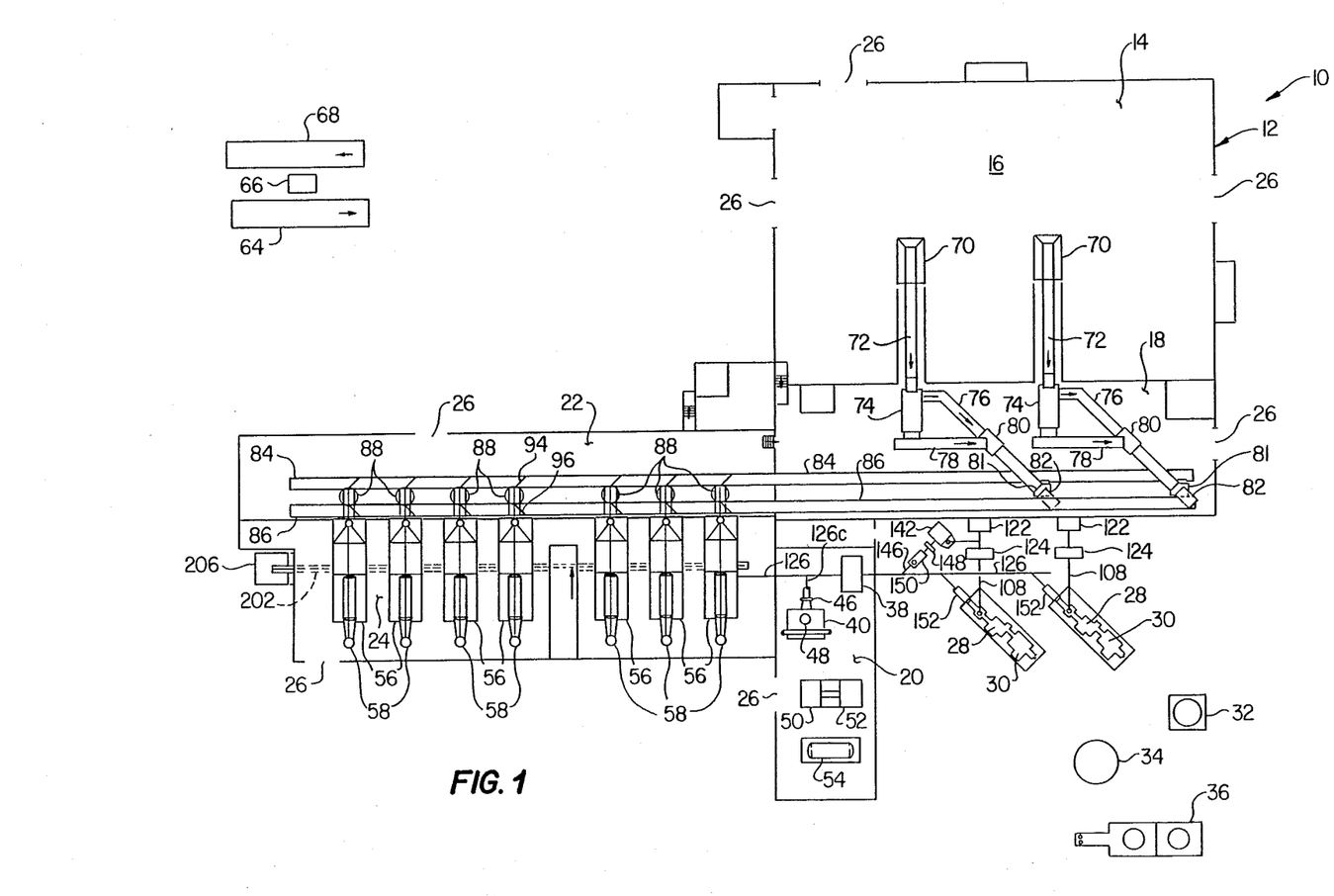
FIG. 1 is a schematic floor plan of a combined cycle waste-to-energy plant that embodies principles of the present invention.
Figure 2:
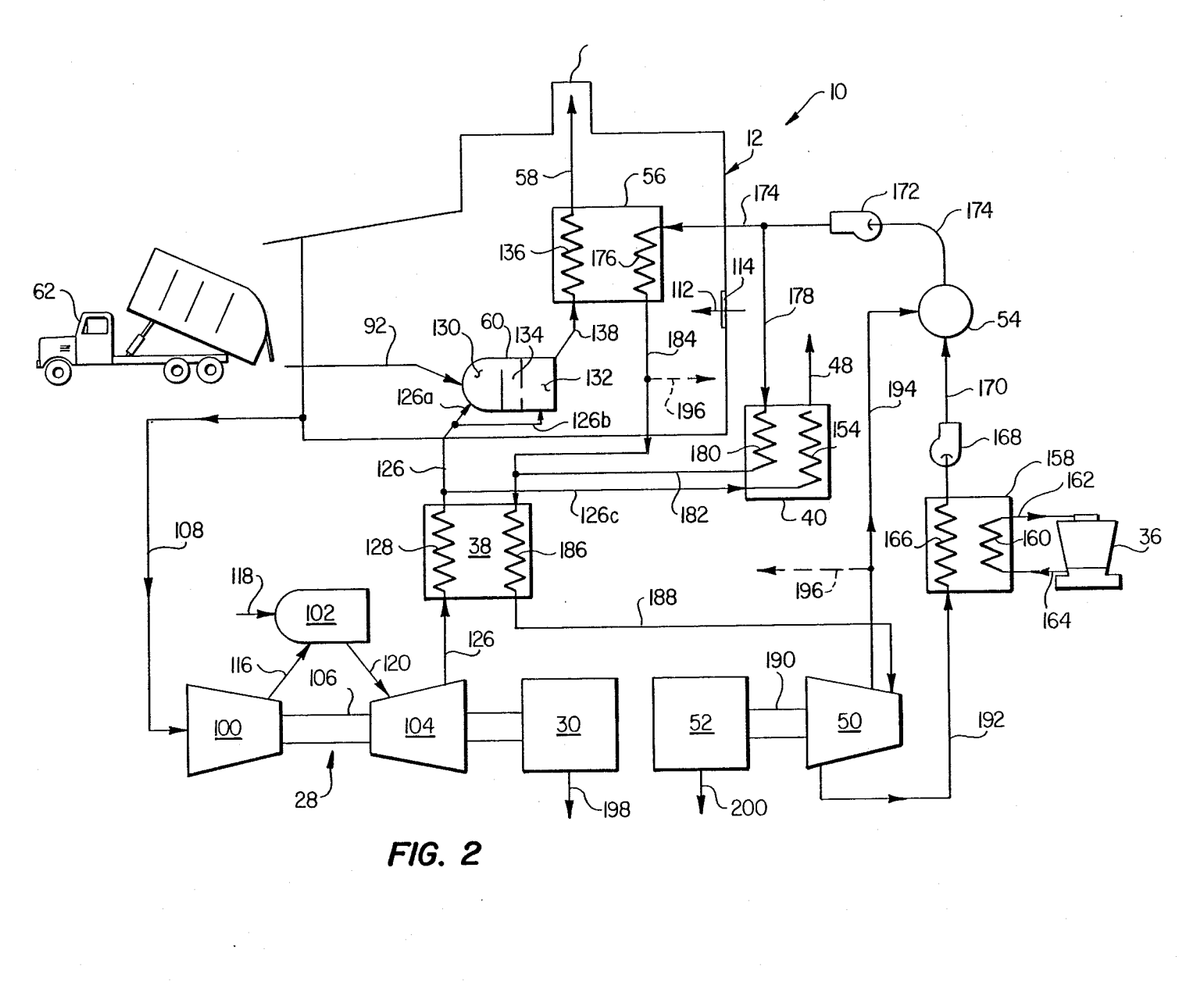
FIG. 2 is a simplified schematic diagram illustrating the overall operation of the plant.

Schematically depicted in FIGS. 1 and 2 is a representative combined cycle waste-to-energy plant 10 that embodies principles of the present invention and is utilized to incinerate municipal solid waste (MSW) and use the MSW as supplemental fuel for generating steam and/or electrical energy. The plant 10 includes a large building enclosure 12 which, as best illustrated in the floor plan of FIG. 1, has an MSW receiving and storage area 14 provided with a tipping floor 16, a waste fuel separation and processing area 18, a waste heat recovery and electrical power generating area 20, an incineration heat recovery area 24, and a waste incineration area 22 disposed directly beneath the incinerator heat recovery area 24. The exterior walls of the building 12 are provided with various overhead door structures 26 as indicated in FIG. 1. When the doors 26 are raised, the door openings are internally blanketed with air discharged from suitable air curtain fans 27 (see FIG. 3) positioned adjacent the door openings.

The waste incineration, heat recovery, and steam and electrical power generating equipment of the plant 10 includes a pair of combustion turbines 28 disposed exteriorly of the building 12 and drivingly connected to electrical generators 30, a standby fuel oil tank 32, a condensate tank 34, and a cooling tower 36, each of which is also disposed outside of the building 12. Located within the building area 20 are a superheater 38, a waste heat recovery steam boiler 40 having an inlet duct burner 46 and an exhaust stack 48, a steam turbine 50 drivingly connected to an electrical generator 52, and a deaerator tank 54. A series of seven incinerator heat recovery boilers 56, each having an exhaust stack 58, are positioned within the building area 24, each of the boilers 56 being positioned above an associated incinerator 60 (see FIG. 2) positioned in the building's incineration area 22. It will be appreciated that the number of combustion turbines 28, incinerator heat recovery boilers 56 and incinerators 60 incorporated in the plant 10 are merely representative. The numbers of these and other components in the plant 10 could be increased or reduced depending on the desired output capacity of the plant.

During operation of the plant 10, MSW is delivered thereto by waste hauling trucks such as the truck 62 depicted in FIG. 2. Truck 62, upon arrival at the plant, is driven onto an "incoming" weighing platform 64 (FIG. 1) positioned on one side of a scale house 66. After the gross weight of the truck and its waste contents are recorded, the truck 62 is driven into the MSW receiving area 14 through one of the overhead doors 26 therein. The waste contents of the truck are then dumped on the tipping floor 16, the truck exits the receiving area 14 and is driven onto an "outgoing" weighing platform 68 positioned on the opposite side of the scale house 66 to thereby determine the net weight of the waste material delivered by the truck.

The dumped waste loads of the truck 62 and other similar trucks are stored on the tipping floor 16 and are periodically pushed therefrom by suitable mobile vehicles into a pair of elongated pit areas 70 formed in the tipping floor 16. Waste pushed into the pits 70 falls onto conveyors 72 positioned therein which elevate the waste to a pair of disc screens 74 that are operatively connected to upwardly sloped conveyor pairs 76, 78 which are in turn connected to shredders 80. This conveyor system, the disc screens 74, and the shredders 80 are of a generally conventional construction and operate to convert the delivered MSW into refuse derived fuel (RDF) which exits the shredders 80 and is conveyed further upwardly to a pair of magnetic separators 81 for removal of ferrous materials and then to a pair of elevated chutes 82, each of which has a pair of vertical branch portions that overlie receiving end portions of a pair of RDF conveyors 84, 86. Suitable flop gate mechanisms (not shown) disposed in each of the chutes 82 are operable to divert RDF falling downwardly through either of the chutes onto a selected one of the conveyors 84, 86.

In this manner, the delivered MSW is converted to shredded combustible waste fuel that is delivered to the primary transport conveyors 84, 86. Additionally incorporated in this processing system, but not illustrated, are various conventional systems and mechanisms for separating from the initially delivered waste large noncombustible items.

The shredded RDF is transported leftwardly and upwardly by the conveyors 84, 86 from the waste fuel processing area 18 into the incinerator area 22, the portions of the conveyors 84, 86 in this latter area straddling a series of open-topped waste fuel hoppers 88, each of which is positioned in front of one of the incinerators 60. As schematically illustrated in FIG. 3, each of the hoppers 88 discharges downwardly into a ram feed section 90 of one of the incinerators 60, the ram feed section 90 receiving RDF 92 dropping downwardly from its associated hopper 88 and functioning in a conventional manner to force the received RDF into the incinerator 60.

RDF being transported leftwardly on either or both of the conveyors 84,86 may be caused to drop into a selected one of the hoppers 88 by means of retractable pairs of plow elements 94, 96 operatively associated with each of the hoppers 88. Each of the plow elements 94, 96 is lowered onto and raised off of the upper surface of one of the conveyors 84, 86 to thereby divert RDF from one or both of such conveyors into a selected one of the hoppers. RDF loaded in this manner into one or more of the series of incinerators 60 is burned therein utilizing a unique combustion process which will now be described, such process converting the RDF into essentially complete products of combustion.

Figure 3:
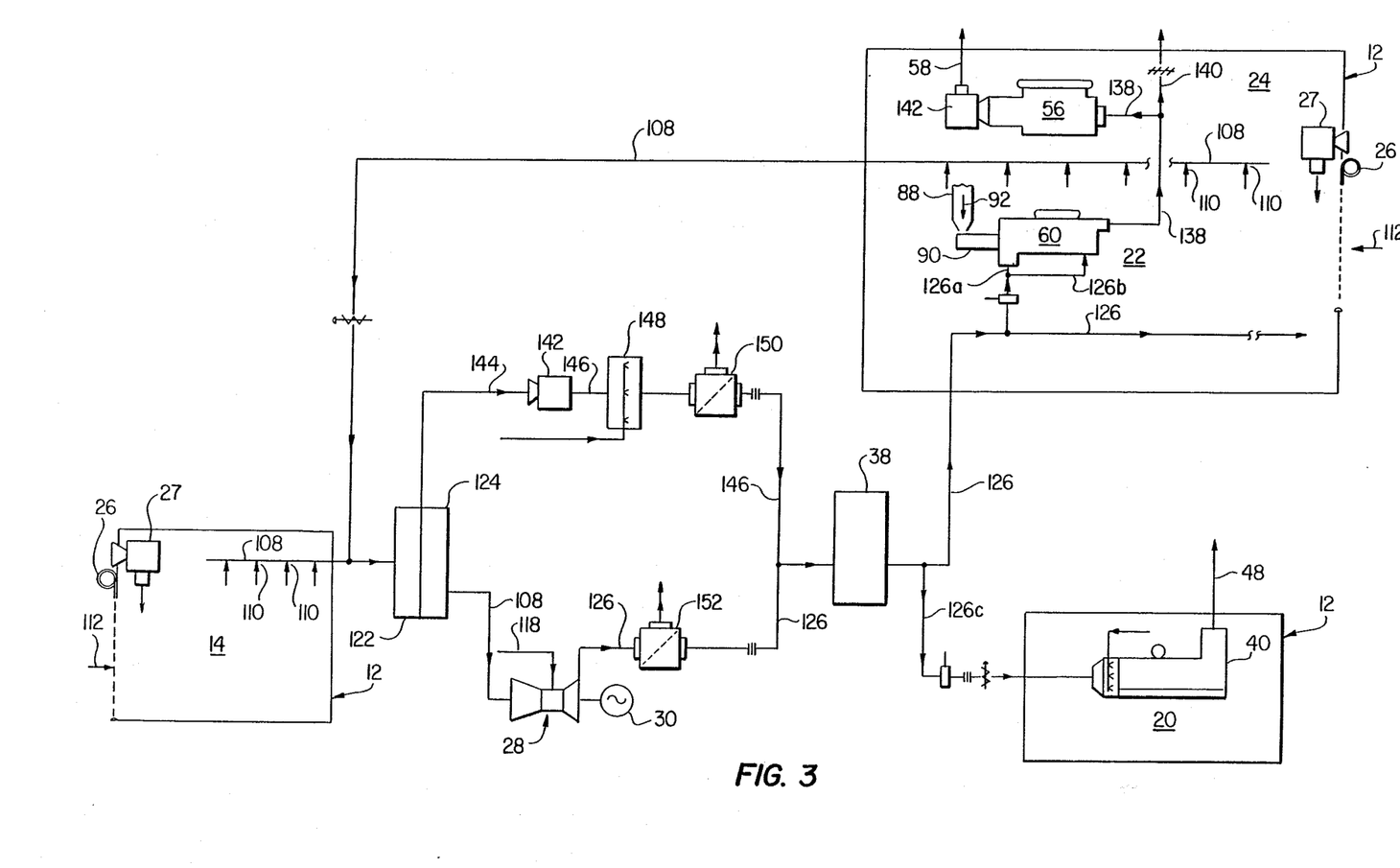
FIG. 3 is a schematic diagram illustrating the combustion air and combustion turbine exhaust flows associated with the waste incineration, heat recovery and power generating system of the plant.

Referring now to FIGS. 2 and 3, each of the combustion turbines 28 includes a compressor 100, a combustor 102, and a turbine section 104 which is drivingly coupled to the compressor 100 and the generator 30 by a shaft 106. During operation of each of the combustion turbines 28, the rotating shaft 106 causes air from within the building 12 to be drawn into the compressor 100 via an inlet duct system 108 which extends into the building and draws air therefrom through suitably distributed inlets 110. Compressor inlet air withdrawn from the interior of the building is replenished with outdoor makeup air 112 which is drawn into the building through suitable wall louvers 114 (FIG. 2) or the like. Importantly, this continuous withdrawal of air from the building interior, and its replenishment with outside makeup air, maintains a negative pressure within the building to prevent the escape therefrom of undesirable odors and pathogens from the MSW stored therein. Escape of such odors and pathogens is further hindered by the air curtains formed at the door openings by the fans 27.

Inlet air entering the compressor 100 is discharged therefrom in the form of high pressure compressed air 116 which, together with natural gas or other fuel 118, is delivered to the combustor 102 and burned therein. This combustion process causes hot exhaust gases 120 to be discharged from the combustor into and through the turbine section 104, thereby rotationally driving the turbine and, via the shaft 106, the compressor 100 and the generator 30. As illustrated in FIGS. 1 and 3, suitable roll filter structures 122 and evaporative coolers 124 are operatively interposed in the inlet duct work system 108 between the combustion turbines 28 and the building 12.

The exhaust gases 120 exiting each of the turbine sections 104 is at approximately 1000° F. and is flowed into a hot gas discharge duct 126 that is operatively connected to each of the incinerators 60 in a manner subsequently described. One side 128 of the superheater 38 is operatively interposed in the duct 126, the superheater 128 functioning in a manner later described to reduce the temperature of the exhaust gases entering the incinerators 60 through the duct 126 to approximately 600° F. As illustrated in FIG. 2, each of the incinerators 60 has a primary combustion chamber 130 into which the RDF is forced by the associated ram feed section 90, and a secondary combustion chamber 132 separated from the primary combustion chamber by a central baffle section 134.

The incinerators 60 are each internally configured in a manner similar to the incinerator illustrated and described in U.S. Pat. No. 3,792,671 to Woods. Such patent is hereby incorporated herein by reference and may be referred to for further details regarding such incinerator.

Unlike the incinerator in the Woods patent, however, the incinerators 60 are not provided with gas burners to sustain combustion. Instead of utilizing natural gas or fuel oil to burn the RDF therein, the incinerators 60 utilize the hot exhaust gases exiting the superheater 38 via duct 126 to provide preheated combustion air and thereby sustain combustion of the RDF. At each of the incinerators 60, the superheater exit portion of the duct 126 is split into branches $126_a$ and $126_b$ which are respectively communicated with the primary and secondary combustion chambers 130, 132. The use of the hot combustion turbine exhaust gases assures essentially complete combustion of the RDF. The products of combustion resulting from this hot exhaust gas incineration process are essentially odor free.

The hot combustion gases discharged from each of the incinerators 60 is at approximately 1800° F. and is flowed from the incinerators to one side 136 of their associated incinerator heat recovery boiler 56 via a duct 138. As illustrated in FIG. 3, a dampered safety dump stack 140 is operatively connected in each of the ducts 138. The incinerator combustion gases exiting each of the boilers 56 is reduced in temperature to approximately 350° F. and is discharged from the boiler by an induced draft fan 142 operatively connected to the boiler stack 58.

Referring now to FIGS. 1 and 3, the incineration system includes an air inlet duct 144 connected to one of the ducts 108 between its filter 122 and cooler 124, and an outlet duct 146 connected to the hot gas discharge duct 126 between the combustion turbines 28 and the superheater 38. Interposed within the duct 146 is a gas fired duct burner 148. The fan 142 and the duct burner 148 may be used to supply supplemental heated air through the discharge duct 126 in the event that one of the combustion turbines is taken off the line for repair purposes, or may be used for preliminary incinerator warmup purposes prior to startup of the combustion turbines, or may be used without the combustion turbines for subsequently described steam generation purposes during periods in which waste is not being incinerated. Suitable dampered safety dump stacks 150 and 152 are operatively connected in the duct 146 and the duct 126 adjacent each of the combustion turbines 28.

Returning now to FIGS. 2 and 3, the quantity of hot combustion turbine exhaust gases discharged from the superheater 38 may be in excess of that required to incinerate the RDF in the incinerators 60. Accordingly, a portion of such exiting combustion turbine discharge gases is flowed through a branch duct $126_c$ through one side 154 of the waste heat recovery boiler 40, the excess combustion turbine exhaust gas being cooled within the waste heat recovery boiler 40 and discharged through its stack 48.

Combustion turbine exhaust heat extracted in superheater 38 and waste heat recovery boiler 40, and solid waste combustion heat extracted in the incinerator heat recovery boiler, 56, are used to generate steam which drives the steam turbine 50 and its associated electrical generator 52. To effect this steam generation, steam turbine exhaust steam 192 is flowed to a condenser 158 (FIG. 2), one side 160 of which is operatively connected by water lines 162, 164 to the cooling tower 36. Condensate exiting the opposite side 166 of the condenser is pumped by condensate pumps 168 through a line 170 to the deaerator 54. Deaerated water exiting the deaerator is pumped by feedwater pumps 172 through line 174 into and through side 176 of each of the incinerator heat recovery boilers 56. A feedwater branch supply line 178 is connected to the water side 180 of the waste heat recovery boiler 40.

Feedwater flowed through boilers 40 and 56 is converted by exhaust and incinerator gas heat therein to saturated steam which is discharged into lines 182, 184 that are interconnected and flow the saturated steam through the steam side 186 of the superheater 38. Steam exiting superheater 38 is in a superheated condition and is drivingly flowed through steam turbine 50 via line 188 to thereby rotationally drive the generator 52 through driveshaft 190.

Exhaust steam discharged from steam turbine 50 is flowed through line 192 to side 166 of condenser 158 to form condensate in line 170, and extraction steam is also drawn from the turbine and flowed via line 194 to the deaerator 54 for mixture with the condensate it receives. Process steam 196 (FIG. 2) may be withdrawn from various points in the steam side of the system just described—for example, from line 184 through which saturated steam is discharged from the incinerator heat recovery boilers 56 into the superheater 38 and/or the extraction steam line 194 connected to the steam turbine 50.

In summary, the plant 10 very efficiently and cleanly burns municipal solid waste, after converting it to refuse derived fuel, utilizing only the high temperature exhaust gases discharged from the combustion turbines 28 to produce superheated steam while simultaneously utilizing a portion of such exhaust gas heat and refuse incinerator heat from the incinerators, to generate saturated steam. Electricity 198, 200 is produced by both the combustion and steam turbine generators 30 and 52. The use of the combustion turbine exhaust in this manner converts the municipal solid waste to essentially complete products of combustion exiting the boiler stacks 58 (FIG. 1). Incinerator ash is dropped into an appropriately positioned drag chain pit 202 for conveyance into removal container 206 positioned at the exterior of building 12 as illustrated in FIG. 1.

A considerable amount of operational flexibility is built into the plant 10. For example, as previously described, processed MSW (i.e., the RDF dropped through the processing discharge chutes 82) may be selectively deposited onto either of the main conveyors 84, 86. Moreover, RDF on either or both of the conveyors 84, 86 may be fed to a selected one or more of the incinerators 60 by appropriate control of the scraper plow elements 94, 96. Thus, controlled feeding of all of the incinerators 60 may easily be achieved, or a selected number of the incinerators may be supplied with RDF while the remainder are undergoing routine maintenance.

Firing capacity flexibility is also provided through the use of the multiple combustion turbines and the auxiliary duct burner. The heat recovery boiler system may also, of course, be used to generate process steam and electricity (in reduced amounts) when MSW is not being burned.

During any operational mode, escape of objectionable refuse odors and pathogens from the building 10 is essentially eliminated due to the aforementioned negative pressure maintained therein by the operation of the combustion turbines 28. Importantly, this permits the plant 10 to be located in urban and residential areas in which it might otherwise be unsuitable.

The plant 10, in addition to its previously described advantages, is constructed from proven and quite reliable components, and provides significantly enhanced overall waste combustion and power generation capabilities compared to conventional MSW combustion plants.

The foregoing detailed description is to be clearly understood as being given by way of illustration and example only, the spirit and scope of the present invention being limited solely by the appended claims.

What is claimed is:

1. A solid waste-to-energy conversion plant comprising:

a building enclosure having a receiving area for receiving and storing solid waste, a waste fuel processing area, a waste incineration area, and a waste combustion heat recovery area;

incinerator means, positioned in said waste incineration area, for receiving refuse derived fuel, and for receiving hot exhaust gas from a source thereof, utilizing the received hot exhaust gas to support combustion of the received refuse derived fuel, and responsively generating hot combustion gases;

fuel processing means, positioned in said waste fuel processing area, for converting solid waste received in said receiving area to refuse derived fuel;

conveying means for conveying refuse derived fuel from said waste fuel processing area to said incinerator means;

incinerator heat recovery boiler means, positioned in said waste combustion heat recovery area, for receiving said hot combustion gases from said incinerator means and water from a source thereof and utilizing the hot combustion gases to convert the water to saturated steam;

waste heat recovery boiler means for receiving hot exhaust gas and utilizing the same to convert water received by said waste heat recovery boiler means to saturated steam;

steam superheater means for receiving hot exhaust gas, and saturated steam from said incinerator heat recovery boiler means and said waste heat recovery boiler means, and responsively generating superheated steam;

steam turbine and generator means for receiving said superheated steam and responsively generating electrical power and discharging saturated steam;

condensate/feedwater means for receiving saturated steam from said steam turbine and generator means and responsively flowing condensed water to said incinerator heat recovery boiler means and said waste heat recovery boiler means; and combustion turbine and generator means for drawing air from the interior of said building enclosure in a manner maintaining it at a negative pressure, mixing the air with fuel from a source thereof, burning the air-fuel mixture, and responsively generating electrical power and flowing hot exhaust gas through said steam superheater means and into said incinerator means and said waste heat recovery boiler means.

2. The solid waste-to-energy conversion plant of claim 1 wherein:

said hot exhaust gas is delivered from said combustion turbine and generator means to said steam superheater means by discharge duct means operatively interconnected therebetween, and said plant further comprises means for selectively creating an auxiliary flow of heated air through said discharge duct means.

3. The solid waste-to-energy conversion plant of claim 2 wherein:

said means for selectively creating an auxiliary flow of heated air through said discharge duct means include an auxiliary duct interconnected between the interior of said building enclosure and said discharge duct means, a fan connected in said auxiliary duct and operative to flow interior building enclosure air into said discharge duct means through said auxiliary duct, and burner means installed in said auxiliary duct for heating air flowing therethrough into said discharge duct means.

4. The solid waste-to-energy conversion plant of claim 1 wherein:

said incinerator heat recovery boiler means include a plurality of incinerator heat recovery boilers positioned in said waste combustion heat recovery area, said incinerator means include a plurality of solid waste incinerators positioned in said waste incineration area, each of said solid waste incinerators being operatively connected to an associated one of said plurality of incinerator heat recovery boilers, and said combustion turbine and generator means include a plurality of combustion turbines each drivingly connected to an associated electrical generator.

5. The solid waste-to-energy conversion plant of claim 4 wherein:

said waste incineration area is disposed beneath said waste combustion heat recovery area, and each of said plurality of solid waste incinerators is positioned beneath its associated incinerator heat recovery boiler.

6. The solid waste-to-energy conversion plant of claim 1 further comprising:

inlet duct means, extending through the interior of said building, for withdrawing air from distributed locations therein and transferring the withdrawn air to an inlet portion of said combustion turbine and generator means.

7. The solid waste-to-energy conversion plant of claim 1 further comprising:

a plurality of overhead door structures positioned in the exterior walls of said receiving area and providing for ingress and egress of waste delivery trucks, and an air curtain fan operatively positioned at each of said overhead doors and operative to form an air curtain along its wall opening.

8. The solid waste-to-energy conversion plant of claim 1 wherein:

said incinerator means include a plurality of solid waste incinerators positioned in said waste incineration area, each of said incinerators having a primary combustion chamber adapted to receiving refuse derived fuel, and a secondary combustion chamber separated from said primary combustion chamber, and said plant further comprises a hot gas discharge duct connected to the hot gas outlet of said steam superheater means and extended to said incinerators, said hot gas discharge duct having at each incinerator first and second duct branches communicating with the primary and secondary combustion chambers of the incinerator, respectively.

9. A solid waste-to-energy conversion plant comprising:

a building enclosure having a receiving area for receiving and storing solid waste, a waste fuel processing area, and a waste incineration area;

a plurality of solid waste incinerators disposed in said waste incineration area, each of said incinerators having an inlet hopper adapted to receive refuse derived fuel and deliver it to a fuel-receiving portion of the incinerator;

mans for delivering to said incinerators a flow of heated gas of sufficient temperature to support combustion of refuse derived fuel within said incinerators and responsively generate a hot combustion gas discharge flow from said incinerators;

steam generating means for utilizing heat from said flow of heated gas and from said hot combustion gas discharge flow to generate steam;

a plurality of fuel processing stations disposed in said building enclosure for converting received solid waste into refuse derived fuel, each of said fuel processing stations including:

means for conveying solid waste from said receiving area to said waste fuel processing area, means for converting the conveyed solid waste to refuse derived fuel, and chute means operative to drop refuse derived fuel to a selected one of two spaced locations in said waste fuel processing area; and delivery means for delivering refuse derived fuel from said waste fuel processing area to said incinerators, said delivery means including:

first and second conveyor means for delivering refuse derived fuel from said waste fuel processing area to opposite sides of upper end portions of said inlet hoppers of said incinerators, said first and second conveyor means having receiving end portions each passing through one of said two spaced locations of said chute means in said waste processing area and disposed beneath said chute means, whereby refuse derived fuel from any of said fuel processing stations may be selectively deposited upon the receiving end portion of either of said first and second conveying means, and diverting means, associated with each of said inlet hoppers, for diverting refuse derived fuel carried by either of said first and second conveyor means into the inlet hopper, whereby refuse derived fuel produced at any selected one of said fuel processing stations may be flowed to any selected one of said inlet hoppers via a selected one of said first and second conveyor means.

10. The solid waste-to-energy conversion plant of claim 9 wherein:

said diverting means include a pair of plow blade members movably supported at each inlet hopper, each blade in each pair thereof being selectively movable onto and off of the upper surface of one of said first and second conveyor means.

11. The solid waste-to-energy conversion plant of claim 9 wherein:

said plurality of solid waste incinerators each have a primary combustion chamber adapted to receive refuse derived fuel, and a secondary combustion chamber separated from said primary combustion chamber, and said means for delivering to said incinerators a flow of heated gas are operative to deliver separate flows of heated gas to the primary and secondary combustion chambers of each of said incinerators.

12. The solid waste-to-energy conversion plant of claim 9 wherein:
said means for delivering to said incinerators a flow of heated gas are operative to maintain a negative pressure within said building enclosure to inhibit escape of solid waste odors and pathogens therefrom.

13. The solid waste-to-energy conversion plant of claim 12 wherein:
said means for delivering to said incinerators a flow of heated gas include at least one combustion turbine having a compressor inlet communicating with the interior of said building enclosure, and a turbine section outlet communicating with the interiors of said incinerators.

14. The solid waste-to-energy conversion plant of claim 13 wherein:
said plant further comprises a steam superheater interposed between said turbine section outlet and said incinerators, and a waste heat recovery boiler,
said flow of heated gas from said at least one combustion turbine is flowed through said steam superheater and into said incinerators, and
a portion of the heated gas discharged from said steam superheater is flowed through said waste heat recovery boiler.

15. The solid waste-to-energy conversion plant of claim 13 wherein:
said turbine section outlet communicates with the interiors of said incinerators through a hot exhaust gas discharge duct, and
said plant further comprises an auxiliary duct interconnected between said discharge duct and the interior of said building enclosure, fan means for flowing building air into said discharge duct through said auxiliary duct, and burner means for heating building air flowed by said fan means into said discharge duct through said auxiliary duct.

16. Apparatus for incinerating solid waste, comprising:
a building enclosure having a receiving area for receiving and storing municipal solid waste (MSW) or the like, a waste fuel processing area, and a waste incineration area;
incinerator means, positioned in said waste incineration area, for receiving refuse derived fuel and hot exhaust gas from a source thereof, and utilizing the hot exhaust gas to support combustion of the refuse derived fuel, without the introduction into said incinerator means of a supplemental fuel, and generate hot combustion gases from said incinerator means;
fuel processing means, positioned in said waste fuel processing area, for converting MSW received in said receiving area to refuse derived fuel (RDF);
conveying means for conveying RDF from said waste fuel processing area to said incinerator means for incineration therein;
means for delivering to said incinerator means a flow of hot exhaust gas of sufficient temperature to support combustion of RDF therein, without the introduction into said incinerator means of a supplemental fuel, said means for delivering utilizing interior building air in a manner maintaining the interior of said building enclosure at a negative pressure to thereby inhibit MSW odor and pathogen outflow therefrom; and
means for recovering heat from said hot combustion gas, and for utilizing the recovered heat to generator steam.

17. The apparatus of claim 16 wherein:
said means for delivering include at least one combustion turbine having a compressor inlet communicating with the interior of said building enclosure and a turbine section outlet communicating with the interior of said incinerator means.

18. The apparatus of claim 17 wherein:
said incinerator means include an incinerator having a primary combustion chamber adapted to receive RDF, and a secondary combustion chamber separated from said primary combustion chamber, and
said turbine section outlet communicates with said primary and secondary combustion chambers through a pair of branch supply ducts operatively connected thereto.

19. The apparatus of claim 16 further comprising:
means for utilizing the steam to generate electricity.

20. The apparatus of claim 16 further comprising:
means for utilizing a portion of the steam as process steam.

21. Apparatus for incinerating solid waste, comprising:
a building enclosure having a receiving area for receiving and storing municipal solid waste (MSW) or the like, a waste fuel processing area, and a waste incineration area;
incinerator means, positioned in said waste incineration area, for receiving refuse derived fuel and hot exhaust gas from a source thereof, and utilizing the hot exhaust gas to incinerate the refuse derived fuel and generate hot combustion gases from said incinerator means;
fuel processing means, positioned in said waste fuel processing area, for converting MSW received in said receiving area to refuse derived fuel (RDF);
conveying means for conveying RDF from said waste fuel processing area to said incinerator means for incineration therein;
means for delivering to said incinerator means a flow of heated exhaust gas of sufficient temperature to support combustion of RDF therein, said means for delivering utilizing interior building air in a manner maintaining the interior of said building enclosure at a negative pressure to thereby inhibit MSW odor and pathogen outflow therefrom,
means for recovering heat from said hot combustion gas, and for utilizing the recovered heat to generate steam;
means for utilizing the stem to generate electricity, said means for recovering heat, and for utilizing the steam to generate electricity including:
incinerator heat recovery boiler means for receiving a throughflow of hot combustion gas discharged from said incinerator means,
steam superheater means for receiving a throughflow of hot exhaust gas discharged from said means for delivering,
waste heat recovery boiler means for receiving a portion of the throughflow of hot gas discharged from said steam superheater means,
condensate supply means for flowing condensate through said combustion heat recovery boiler means and said waste heat recovery boiler means to generate saturated steam therefrom, means for flowing the saturated steam through said steam superheater means to generate superheated steam, a steam turbine drivingly connected to a first electrical generator, and means for drivingly flowing the superheated steam through said steam turbine; and a second electrical generator driven by said means for delivering.

* * * * *